F. L. O. WADSWORTH.
MANUFACTURE OF SHEET GLASS.
APPLICATION FILED APR. 13, 1909.

1,119,329.

Patented Dec. 1, 1914.
2 SHEETS—SHEET 1

F. L. O. WADSWORTH.
MANUFACTURE OF SHEET GLASS.
APPLICATION FILED APR. 13, 1909.

1,119,329.

Patented Dec. 1, 1914.
2 SHEETS—SHEET 2.

WITNESSES:

INVENTOR

UNITED STATES PATENT OFFICE.

FRANK L. O. WADSWORTH, OF SEWICKLEY, PENNSYLVANIA.

MANUFACTURE OF SHEET-GLASS.

1,119,329. Specification of Letters Patent. Patented Dec. 1, 1914.

Application filed April 13, 1909. Serial No. 489,573.

*To all whom it may concern:*

Be it known that I, FRANK L. O. WADSWORTH, residing at Sewickley, in the county of Allegheny and State of Pennsylvania, a citizen of the United States, have invented or discovered certain new and useful Improvements in the Manufacture of Sheet-Glass, of which improvements the following is a specification.

The invention described herein relates to certain improvements in the manufacture of wire glass, and has for its object the passing of the fabric or reinforce into a mass of glass and out of the same in a direction substantially at right angles to the surface of the glass.

The invention is hereinafter more fully described and claimed.

Figure 1:
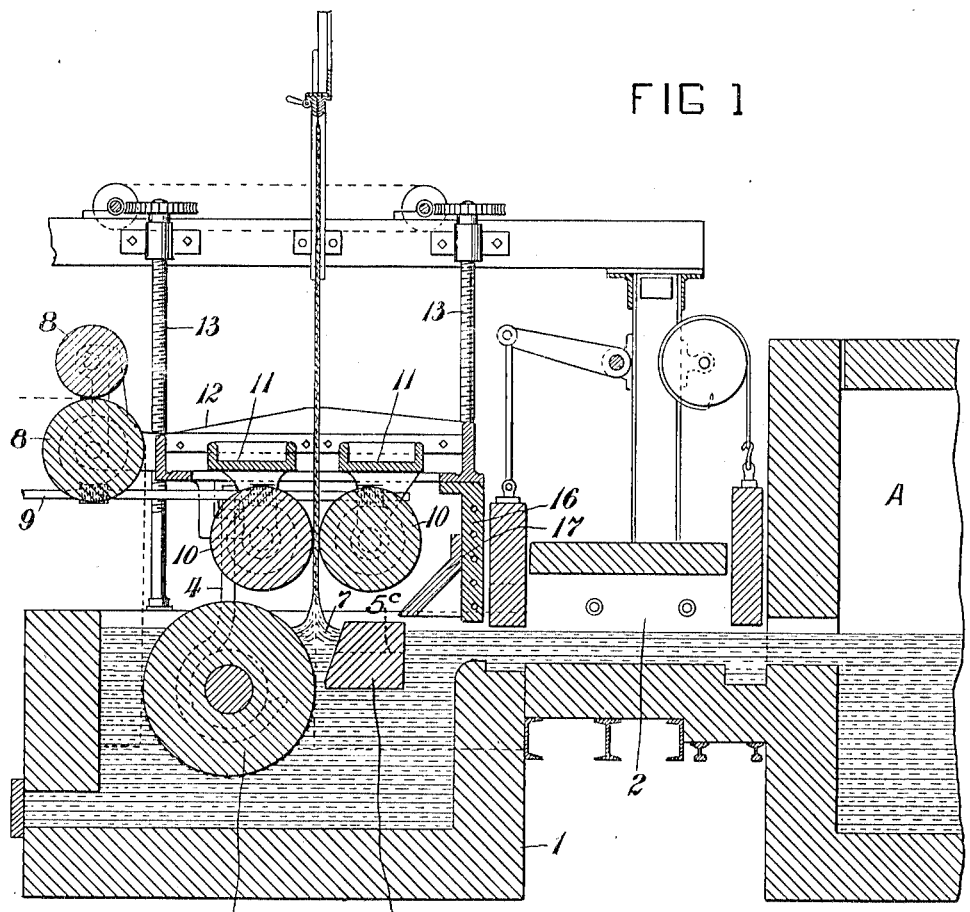
Figure 2:
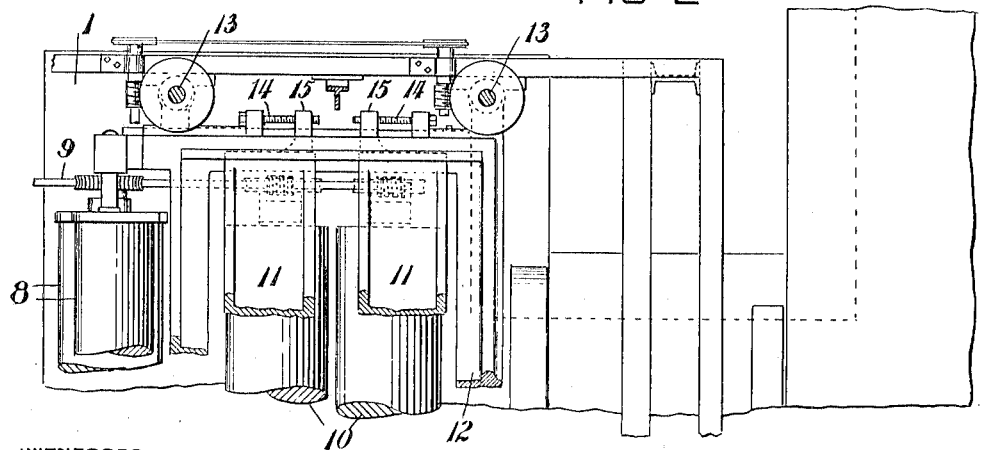
Figure 3:
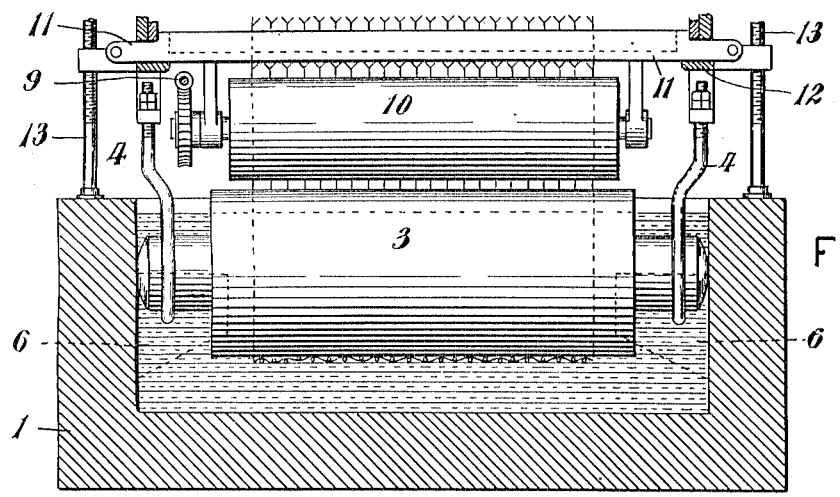
Figure 4:
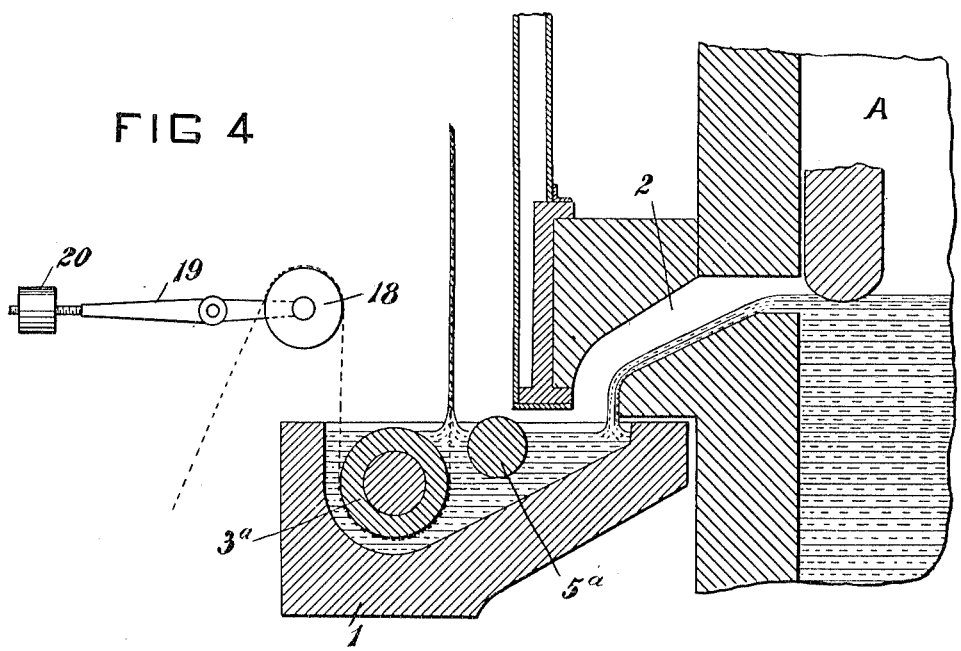

In the accompanying drawing forming a part of this specification Figure 1 is a sectional elevation showing a portion of the tank furnace, a pot or receptacle from which the glass is drawn and the drawing or sheet-forming apparatus; Fig. 2 is a top plan view partly in section of the apparatus shown in Fig. 1; Fig. 3 is a sectional elevation showing the pot with its contained roller and the sizing or smoothing rolls; Fig. 4 is a view similar to Fig. 1 illustrating certain modifications of the apparatus.

In the practice of my invention a pot or receptacle 1 through which the fabric or reinforce is to be passed is arranged in suitable relation to the outlet passage 2 of the tank furnace A. In forming the reinforced glass, the fabric or reinforce is passed down directly into the glass around a roll arranged within the pot and partially submerged in the glass, and then drawn out of the glass in a direction substantially at right angles to the surface of the latter. The roll 3 is designed to move freely within the pot 1 and may be held freely in the desired position either by reason of its own buoyancy, or by the tension of the fabric which is to be covered. It can be lifted out of the glass entirely or in part when desired by the hook 4 adjustably connected to a part of the frame work of the drawing apparatus. This roll is made of a length somewhat shorter than the length of the pot so that glass may flow around its ends to the space between the roll and the abutment 5, through which space or slot the fabric passes on its way out of the glass. The abutment 5, which may be of any desirable shape in cross section, preferably angular, is supported at its ends upon ledges 6 formed in the end walls of the pot or receptacle 1. A portion of the abutment of a length equal to or approximately equal to the body portion of the roll, extends above the surface of the glass, while the end portions of the abutment are at less height, as shown by the dotted line $5^c$, Fig. 1, so that the glass flowing from the tank will pass around the ends of the abutment into the space or slot 7 formed by the abutment and roll, thus providing in said space a free body of glass which may be constantly replenished by the natural flow of glass from the main body. The abutment prevents the glass while in its hottest condition from flowing directly to the space where the sheet is to be formed and the abutment and roll isolate a certain portion of the glass just prior to its application to the reinforce and thus allow a cooling down of the glass prior to such application. The reinforce or wire fabric is drawn from a suitable reel and passed between a pair of feed rolls 8 which regulate its rate of movement into the pot. One of these rolls is positively driven by a worm and gear connection from the shaft 9. The same shaft is employed for operating the smoothing or figuring rolls 10 through which the glass-covered fabric is passed as it moves up from the pot. These rolls 10 are independently mounted on slides 11, which in turn are mounted in suitable guides on a frame 12 carried by threaded posts 13. The positions of the slides 11 and also of the rolls with relation to each other and the sheet being formed is determined by suitable means, such for example as the screws 14 passing through lugs on the frame 12 and engaging internally threaded lugs 15 on the slides. The position of the frame 12 and consequently of the rollers 10 with relation to the surface of the glass in the pot 1 can be adjusted by rotating the screws 13. In order to protect the rolls and the sheet being formed from the high heat of the glass as it passes through the outlet 2, a curtain wall 16 is provided through which a cooling medium can be caused to flow and to this wall is attached a hood 17 which serves as a further shield for the rolls.

In the construction shown in Fig. 4 a floating abutment $5^a$ is employed to prevent the direct flow of the hottest glass to the slot where the fabric passes from the pot. In this construction the roll 3ª which preferably consists of a metal core having a shell or coating of fire-clay, is supported by the fabric. This fabric passes from a reel (not shown) around a tension pulley 18 supported on one end of arms 19 provided at their opposite ends with adjustable weights 20. As will be readily understood the position of the weights 20 will determine the vertical position of the roll 3ª in the bath, provided that the rate of movement of the fabric from the reel is regular or uniform.

It is characteristic of my improvement that the fabric passes through a mass or body of glass which is isolated as it were from the main body of glass in the pot, but which is in open communication therewith and is thus maintained at the same level, and the isolation is such that this body or portion of glass will have a lower temperature than the other portions of the glass in the pot. This reduction of temperature of the glass at the time of its deposition on the fabric is desired, but provision should be made to maintain the glass outside of the slot or at points not adjacent to the plane of movement of the fabric, in a sufficiently fluid condition to maintain a constant supply of glass to the line of emergence of the fabric from the glass.

The mechanism employed for drawing the sheets and for operating the rolls 10 and the means controlling the movement of the reinforce, should be so constructed that said parts will move synchronously.

It is characteristic of my improvement that the parts or members forming the slot are immersed to such an extent in the glass that the narrowest portion of the slot is a substantial distance below the surface of the glass and that the glass will flow into the basin formed by these members and through which the web is drawn around the ends of the members and up through the slot. There is only a natural flow of the glass to the basin formed by said members, which have as one of their functions the isolation of a free body of glass, that is, one not dependent for its maintenance upon a forced flow. It will be observed that the glass is not applied to the fabric after the latter has passed above the surface of the glass in the pot or receptacle. The application of the glass is due to the passage of the fabric through the glass and not to the mechanical transfer of the glass to and its deposition on the fabric.

I claim herein as my invention:

1. In an apparatus for drawing glass sheets having an embedded reinforce, the combination of a receptacle for the glass, a roll so arranged in the glass that the reinforce may pass into the glass on one side of the roll, and means for drawing the reinforce from the glass on the opposite side of the roll, the latter being immersed to such a depth that a free body of glass on substantially the same level as the glass in the receptacle will be maintained between the roll and the outwardly moving reinforce and above the plane where the reinforce passes out of contact with the roll.

2. In an apparatus for drawing glass sheets having an embedded reinforce, the combination of a receptacle for the glass, a roll immersed in the glass to a point above its axis, means for guiding the reinforce into the glass on one side of the roll and means for drawing the reinforce from the glass on the opposite side of the roll.

3. In an apparatus for drawing glass sheets having a reinforce embedded therein, the combination of a receptacle for the glass, means for causing the reinforce to move down into and up from the glass, and a roll immersed in the glass to a point above its axis and supported by the loop formed by the reinforce in the glass.

4. In an apparatus for drawing glass sheets having an embedded reinforce, the combination of a receptacle for the glass, a tension guide for the reinforce, a drawing mechanism, and means for forcing the reinforce intermediate of the guide and drawing mechanism, into the glass, said means being vertically movable by variations in the relation of the tension and draft in the reinforce.

5. In an apparatus for drawing glass sheets having a reinforce embedded therein, the combination of a receptacle for the glass, movable parts arranged in the receptacle to form a slot, and means for passing the reinforce into the glass and out through the slot formed by said parts, said parts being so arranged relatively to each other and having such a depth of immersion as to provide free substantially symmetrical bodies of glass between said parts and the reinforce at points above the slot.

6. In an apparatus for drawing glass sheets having a reinforce embedded therein, the combination of a receptacle for the glass, a roll and an abutment arranged in the receptacle and extending below the level of the glass contained therein, and means for causing the reinforce to pass around the submerged portion of the roll and out between the roll and abutment, the roll and abutment being submerged to such a depth as to provide above a plane passing through points on said parts most nearly adjacent to each other, a free body of glass having its surface on or approximately on a level with the surface of the glass in the receptacle.

7. In an apparatus for drawing glass sheets having a reinforce embedded therein, the combination of a receptacle for the glass, a roll and an abutment arranged in suitable relation to each other for localizing a free body of glass adjacent to the plane in which the reinforce leaves the glass, having its surface on or approximately on a level with the surface of the glass in the receptacle, one of said parts being movable relatively to the other, and means for passing the reinforce into the glass and out through the free portion of glass localized by the roll and abutment.

In testimony whereof, I have hereunto set my hand.

FRANK L. O. WADSWORTH.

Witnesses:
　CHARLES BARNETT,
　FRANCIS J. TOMASSON.